Patented Nov. 11, 1941

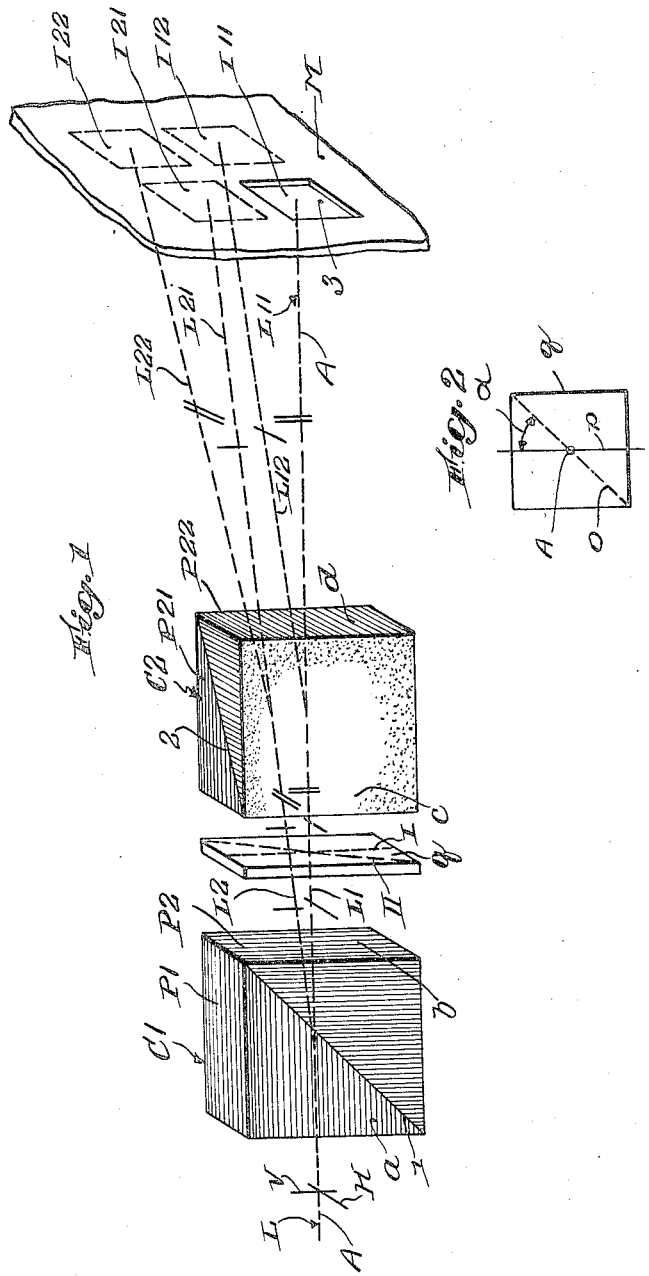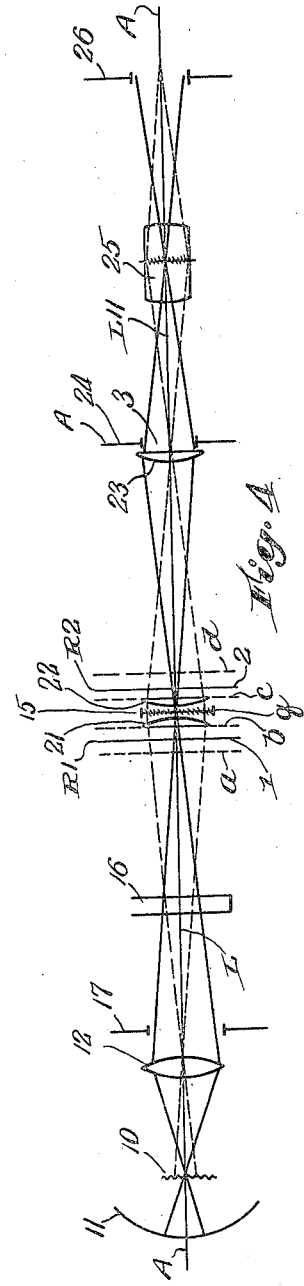

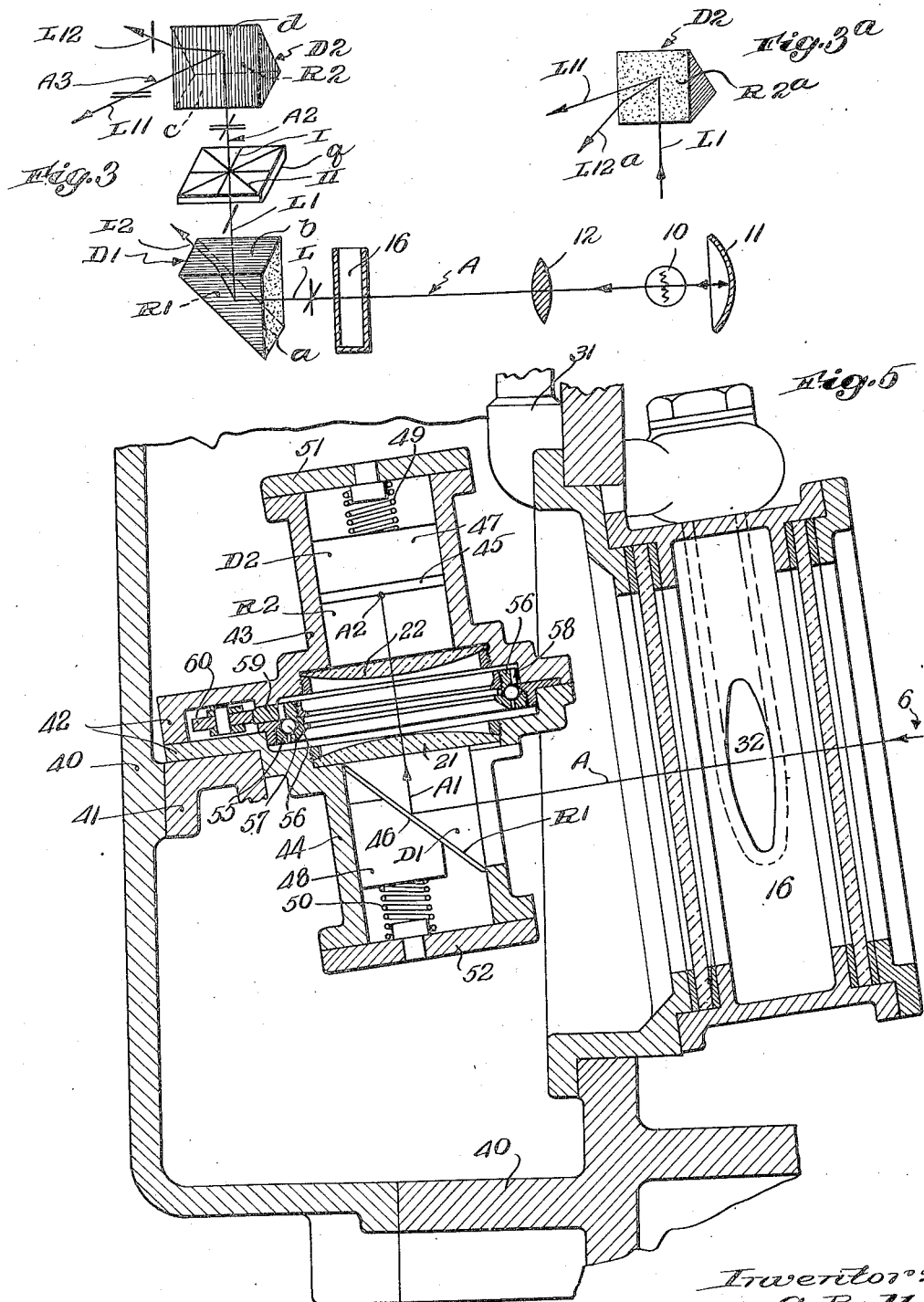

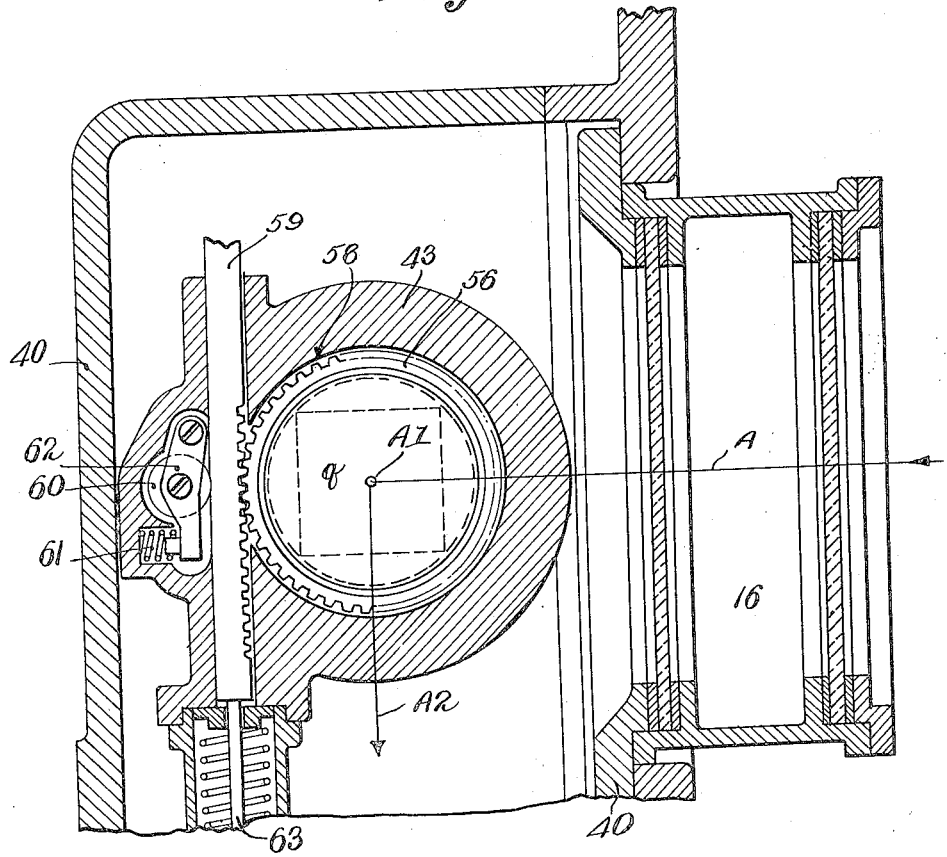

2,262,524

UNITED STATES PATENT OFFICE 2,262,524

LIGHT CONTROL BY POLARIZATION

Joseph A. Ball, Los Angeles, Calif., assignor to Technicolor Motion Picture Corporation, Los Angeles, Calif., a corporation of Maine Application March 13, 1939, Serial No. 261,404

4 Claims. (Cl. 88—24)

The present invention deals with control of polarized light and the regulation of light intensities; it is especially suited in connection with processes requiring instantaneous and exact control of light intensities without setting free in the light path large amounts of heat energy which can be disposed of only with difficulty. Problems of this type are present for example in the photographic arts, especially concerning the control of the intensity of light used for copying motion picture film.

It is therefore one of the main objects of my invention to provide a method, and apparatus to carry out that method, for controlling the intensity of light beams in simple, inexpensive, convenient and yet exact manner; further objects are to provide an improved light control device for photographic apparatus, an optical system for such apparatus incorporating the new light control device, and a device for effectively mounting and actuating light control devices of my improved type. In another aspect, my invention provides a novel polarizer-analyzer arrangement; still other features are the dissipation of undesired light energy at points removed from the effective light path of optical apparatus, and the cyclic control of the light intensities of a series of light beams.

These and other objects, aspects and features of my invention will be apparent from the following description of its principle as well as of several concrete embodiments thereof explaining its genus by way of example. This description refers to drawings in which:

Fig. 1 is an optical diagram of polarization equipment according to the invention;

Fig. 2 is a detail view of a half wave length plate;

Figs. 3 and 3ᵃ are optical diagrams of two similar embodiments of the invention;

Fig. 4 is a straight axis diagram corresponding to Figs. 1 and 3 but including the complete optical equipment of a photographic projection printer;

Fig. 5 is a section on axes L—L1 of Fig. 3, of a practical embodiment of the arrangement according to Fig. 3; and Fig. 6 is a section on lines 6—6 of Fig. 5.

Referring to Figs. 1 and 2, the optical axis of a system according to my invention is indicated at A, this axis coinciding with an incident light beam L. In the beam is placed a calcite prism C1 for example of the known Sénarmont type (Pockels, Lehrbuch der Kristalloptik, 1906, page 26) comprising two component prisms P1 and P2, cemented together at 1 and 2, respectively, with the optic axes or directions of equal light velocity parallel and perpendicular to beam L, as indicated in the drawings by hatching the prism surfaces.

A second similar prism C2 consists of two components P21 and P22. The position of C2, relatively to the axis L, corresponds to that of prism C1 rotated 90° about axis L. Between prisms C1 and C2 is arranged a uniaxial element of the "half wave length plate" type, for example, a quartz plate $q$ having a thickness of about 0.032 mm. or an odd integral multiple thereof (preferably 0.350 mm. for yellow light) and with its optic axis parallel to its faces. An image receiving device is indicated at M; in the present instance this may be a plate having an aperture 3.

Assuming the incident light to be unpolarized (as indicated by marks H and V in ray L), component P1 of prism C1 will not affect the ray, whereas in component P2, the extraordinary ray L2 will be deviated as indicated.

As well known, a half wave length plate as above described converts the azimuth angle $\alpha$ (Fig. 2) between the plane of polarization $p$ of the incident light and the optic axis $o$, into an azimuth angle of the same numerical value, but counted in opposite direction, or $-\alpha$. Hence, if the optic axis of plate $q$ is in position I (Fig. 1), the planes of polarization are not changed, as indicated by the single line marks in front of and behind plate $q$. Therefore, ray L1 is extraordinary for prism C2 and is diverted into direction L12, whereas beam L2 is transmitted as indicated at L21; rays in directions L11 and L22 are extinguished. If the plate $q$ is rotated 45°, so that the optic axis comes into position II, the planes of polarization will be rotated 90°, beam L1 becoming the ordinary beam for prism C2 transmitted as L11, whereas L2 becomes extraordinary for C2 and is deviated as L22. Rays in directions L12 and L21 are extinguished.

It will now be evident that—assuming that L is an image bearing beam focused at M—with plate $q$ in position I, images with about 50% light intensity (disregarding reflection and absorption losses) of L will be produced at I12 and I21, whereas with the plate in position II, similar images are provided at I11 and I22. On the other hand, I11 and I22 are dark with the plate in position I, and I12 and I21 are dark with the plate in position II. For intermediate positions of the plate, the fields will have correspondingly intermediate intensities.

While, for certain purposes, all images with their co-related light intensities may be utilized, for purposes of the embodiments described hereinafter only one field, for example L11 is used and any light in the other fields rendered ineffective, for example by absorption at suitable surfaces, if desired blackened or having suitable devices for dissipating or carrying off heat energy.

Instead of using composite prisms, as shown in Fig. 1, I may employ totally reflecting calcite prisms, and this modification, shown in Fig. 3, is especially suitable for purposes of the practical embodiment forming part of a projection printer, to be described with reference to Figs. 3 to 6.

As shown in Fig. 3, ray L enters prism D1, oriented as shown, and is not affected until it reaches reflecting surface R1. Along the path from R1 to the emergent surface, the optical conditions are similar to those in component P2 of Fig. 1, and a ray L2 will be diverted. Prism D2 may be arranged in such a manner that the axis A3 of the reflected beam will be perpendicular to the plane defined by incident beam A1 and intermediate axis A2. The optical effect of D2 is analogous to that of C2 of Fig. 1, a beam L12 being diverted, as above described. A half wave plate $q$ is again interposed and affects the plane of polarization as above explained; in position I, the main beam is extraordinary for D2 and extinguished extraordinary beams L2 and L12 being diverted by the prisms. In position II, beams L12 and L21 are again extinguished but main beam L11 is transmitted, Fig. 3 indicating these conditions with numerals and marks corresponding to those of Fig. 1.

For the above-mentioned practical embodiment, I found the optical arrangement schematically indicated in Fig. 4 quite suitable.

In Fig. 4, a light source 10, as for example the filament of an incandescent lamp is reflected upon itself by spherical reflector 11, as customary in such systems. A condenser lens 12 collects the light, and a water cell 16 and a light baffle 17 are inserted in the beam emerging from the condenser. In Fig. 4, the surfaces of the prisms of Figs. 1 and 3 are indicated with numerals corresponding to those of these figures, and it will be noted that the cemented faces of Fig. 1 correspond to the reflecting surfaces of Fig. 3.

In order to assure proper functioning of the half wave length plate $q$, collimator lenses 21 and 22 are cemented to the inner prism surfaces $b$ and $c$. An aperture lens 23 is located near the negative aperture 24, from which a transparent record is projected, by means of objective 25, to positive aperture 26. Fig. 4 shows two systems of limiting rays; the first system, in full lines, corresponds to the field stops, and indicates that the filament 10 is imaged in plane 15 between the collimator lenses 21, 22, and in the objective 25. The second ray system, in dotted lines, corresponds to the aperture stops and indicates that a plane approximately in the condenser baffle is imaged in the negative and positive apertures 24 and 26, respectively. A satisfactorily working embodiment has a condenser lens of about 3″ focal length placed at a distance of about 3¾″ from the filament and about 12¾″ from the half wave length plate, the aperture lens of about 4″ focal length being about 8″ from the plate, and a 4″, f:3 copying lens about half-way between negative and positive apertures about 15½″ apart. With these dimensions, plano-convex collimator lenses 21 and 22 of about 9¾″ focal length give satisfactory results.

Fig. 3 incorporates the optical elements in front of the light regulator, and Figs. 5 and 6 show an actual construction of the light regulator, the optical axes in Figs. 3, 5 and 6 being placed as far as possible in corresponding directions. In Figs. 5, and 6, 16 is again the water cell, with supply tube 31 and supply port 32, a discharge opening and tube being similarly arranged on the opposite side.

The water cell 16 and a prism holder 42 are mounted on an apparatus housing 40, 41 which may also support the other elements indicated in Fig. 4, but not shown in detail because unessential for present purposes. Prism holder 42 supports two prism mounts 43, 44. Secured in the respective mounts by means of the usual threaded rings are collimator lenses 21, 22 cemented to prisms D1, D2, respectively, the prisms being secured in their respective mounts by plates 45, 46, blocks 47, 48, springs 49, 50, and cover plates 51, 52. Between the flanges of sleeves 43, 44 is mounted the half wave length plate $q$, by means of a ball bearing with rings 55, 56 and balls 57. Ring 56 has an outside gear 58 (see especially Fig. 6) engaging a rack 59. Back lash is avoided by means of roller 60 in lever 61 and spring 62 pressing rack 59 against gear ring 56. Rack 59 is connected to a tie rod 63 moved back and forth by suitable means controlling the intensity of the light beam; such an arrangement, actuated by the negative film to be printed is for example disclosed in the copending application, Serial No. 261,339, filed March 11, 1939.

It will now be evident that by shifting rack 59 and thereby rotating ring 56 with plate $q$, the intensity of the light which illuminates negative aperture 3 can be regulated from full to dark, this wide range corresponding to the comparatively short 45° rotation of the half wave length plate. It will also be apparent that, in this example, only beam L11 is used; the three other images are received at portions of the housing from where the heat can be conveniently carried off by conventional means. It may be desirable, however, to utilize all four images whose intensities are interdependent as above described.

It is understood that the doubly refracting elements can be differently, but analogously arranged. For example, as shown in Fig. 3a, prism D2 can be reversed as indicated, with its optic axis parallel to the emergent ray L11. In that case, the extraordinary ray X would be deflected downwardly, as indicated at L12a of Fig. 3a.

It will be understood that the cemented or reflecting surfaces of the prisms need not be inclined at 45° to the optical axes, and that the principles of prisms other than the Sénarmont prism can be advantageously applied, for example those of the Wollaston or Rochon prisms.

From the above description, it will be evident that the new device does not require the accurate centering which is for example necessary if an iris shutter were used for the regulation of the light intensity; in the present instance the light intensity is merely dependent upon the angular relation of the optic axes and not, for example, the alignment of an aperture. Further, mechanical backlash inherent in conventional regulators is avoided. Still further, the correlation of the planes of polarization by means of a half wave length plate eliminates any irregularities due to changes of the wave lengths transmitted at different light intensities; it is well known that for example polarizer-analyzer arrangements employing polarizing sheet material transmit different color ranges with changing inclinations of the optic axes. The same disadvantage is, of course, present if the light intensity is regulated by means of changing the voltage of the light source. As pointed out above, my invention provides for deviation of unneeded light energy from the effective light path; while shutters, wedges and similar devices necessitate the removal of heat from the light path proper, my arrangement diverts the unwanted radiant energy to points where it can be easily controlled.

It should be understood that the present disclosure is for the purpose of illustration only and that this invention includes all modifications and equivalents which fall within the scope of the appended claims.

I claim:

1. Projection apparatus comprising means for forming an image bearing light beam, in said beam an undivided birefringent prism having a surface substantially normal to the optic axis of the prism and admitting said beam, an external surface inclined to and totally reflecting said beam, and a surface substantially parallel to said axis and emitting said beam, in said beam an optical unit for rotating the plane of polarization of said beam, and in said beam another birefringent prism, means for mounting said prisms substantially fixed relatively to each other and to said beam, and means for rotating said optical unit, said prisms constituting polarizer and analyzer, respectively, and said plate causing the analyzer prism to extinguish varying amounts of light, corresponding to the rotation of the polarized beam by the plate.

2. Projection apparatus comprising means for forming an image bearing light beam, in said beam a first birefringent prism having a surface substantially normal to the optic axis of the prism and admitting said beam, a surface inclined to and totally reflecting said beam, and a surface substantially parallel to said axis and emitting said beam, in series with the first prism in the reflected ordinary beam a half wave length plate, and further in series in said reflected beam a second birefringent prism having a surface substantially normal to the optic axis of the prism and admitting said reflected beam, a surface inclined to and totally reflecting said reflected beam and a surface substantially parallel to said axis and emitting said beam, means for mounting said prisms substantially fixed relatively to each other and to said beams, and means for rotating said half wave length plate, said first and second prisms constituting polarizer and analyzer, respectively, and said plate causing the analyzer prism to extinguish varying amounts of light, corresponding to the rotation of the polarized beam by the plate.

3. An adjustable illumination system for projection apparatus comprising a light source, a half wave plate, means for rotatably mounting said plate, lens means having a power and being distanced between said source and said plate to provide an image of said source substantially at said plate, in front of said plate a polarizing prism, on said prism facing said plate a collimating lens, behind said plate a second polarizing prism, and an object support beyond said second prism.

4. An adjustable illumination system for projection apparatus comprising a light source, a half wave plate, means for rotatably mounting said plate, lens means having a power and being distanced between said source and said plate to provide an image of said source substantially at said plate, in front of said plate a polarizing prism, on said prism facing said plate a collimating lens, behind said plate a second polarizing prism, on said second prism facing said plate a second lens substantially symmetrical to said collimating lens, an object support beyond said second prism and in front of said support a collective lens projecting said source image through said support.

JOSEPH A. BALL.